(12) United States Patent
Chen

(10) Patent No.: US 12,321,004 B2
(45) Date of Patent: Jun. 3, 2025

(54) BACKLIGHT KEYSWITCH AND BACKLIGHT MODULE THEREOF

(71) Applicant: DARFON ELECTRONICS CORP., Taoyuan (TW)

(72) Inventor: Chao-Yu Chen, Taoyuan (TW)

(73) Assignee: DARFON ELECTRONICS CORP., Taoyuan (TW)

(*) Notice: Subject to any disclaimer, the term of this patent is extended or adjusted under 35 U.S.C. 154(b) by 0 days.

(21) Appl. No.: 18/368,538

(22) Filed: Sep. 14, 2023

(65) Prior Publication Data

US 2024/0094457 A1    Mar. 21, 2024

Related U.S. Application Data

(60) Provisional application No. 63/408,062, filed on Sep. 19, 2022, provisional application No. 63/408,069, filed on Sep. 19, 2022.

(30) Foreign Application Priority Data

Apr. 26, 2023    (TW) ................................. 112115564

(51) Int. Cl.
| | |
|---|---|
| *F21V 8/00* | (2006.01) |
| *H01H 13/02* | (2006.01) |
| *H01H 13/14* | (2006.01) |

(52) U.S. Cl.
CPC ......... *G02B 6/0043* (2013.01); *G02B 6/0091* (2013.01); *H01H 13/023* (2013.01); *H01H 13/14* (2013.01)

(58) Field of Classification Search
CPC .... G02B 6/0091; G02B 6/0043; H01H 13/14; H01H 13/023
See application file for complete search history.

(56) References Cited

U.S. PATENT DOCUMENTS

| 6,743,993 B1 | 6/2004 | Clark |
| 9,040,856 B2 | 5/2015 | Chen |
| (Continued) | | |

FOREIGN PATENT DOCUMENTS

| CN | 202905541 U | * 4/2013 | ............... H01H 1/06 |
| CN | 102141215 B | 4/2014 | |
| (Continued) | | | |

OTHER PUBLICATIONS

Innovation Q+ NPL Search (Year: 2024).*

(Continued)

*Primary Examiner* — Anabel Ton
(74) *Attorney, Agent, or Firm* — Winston Hsu

(57) ABSTRACT

A backlight keyswitch includes a keycap, a support plate, a membrane circuit board and a backlight module. The support plate is disposed under the keycap. The membrane circuit board is disposed in parallel to the keycap and the support plate. The backlight module is disposed under the support plate, which includes a shielding sheet, a light guide panel, a lighting board and a protrusion structure. The shielding sheet includes a light permeable area corresponding to the keycap. The light guide panel is disposed under the shielding sheet. The lighting board is disposed under the light guide panel and includes a light source. The protrusion structure protrudes toward the light source and is formed on one of the support plate, the membrane circuit board and the shielding sheet. The protrusion structure reflects at least partial light of the light source to enter the light guide panel for lateral transmission.

25 Claims, 11 Drawing Sheets

(56) References Cited

U.S. PATENT DOCUMENTS

| | | |
|---|---|---|
| 9,214,301 B2 | 12/2015 | Chen |
| 9,299,515 B2 | 3/2016 | Chen |
| 10,276,327 B2 | 4/2019 | Chen |
| 10,586,664 B2 | 3/2020 | Yeh |
| 11,036,306 B2 | 6/2021 | Cheng |
| 11,257,638 B2 * | 2/2022 | Liang .................... H01H 13/14 |
| 11,371,676 B2 | 6/2022 | Huang |
| 11,409,373 B2 | 8/2022 | Cheng |
| 11,443,907 B2 | 9/2022 | Ho |
| 11,515,107 B2 | 11/2022 | Chen |
| 11,538,641 B2 | 12/2022 | Liang |
| 2011/0037730 A1 | 2/2011 | Wang |
| 2014/0166457 A1 | 6/2014 | Chen |
| 2017/0352504 A1 | 12/2017 | Chen |
| 2019/0027326 A1 | 1/2019 | Tsai |
| 2019/0369744 A1 | 12/2019 | Wu |
| 2020/0402748 A1 | 12/2020 | Cheng |
| 2022/0244445 A1 | 8/2022 | Chen |
| 2022/0336167 A1 * | 10/2022 | Huang .................... H01H 13/83 |
| 2023/0047235 A1 | 2/2023 | Chen |

FOREIGN PATENT DOCUMENTS

| | | |
|---|---|---|
| CN | 106783308 A | 5/2017 |
| CN | 110335775 A | 10/2019 |
| CN | 113632249 A | 11/2021 |
| CN | 217134252 U | 8/2022 |
| JP | 2019-139728 | 8/2019 |
| TW | M334393 | 6/2008 |
| TW | M395202 U1 | 12/2010 |
| TW | I527075 B | 3/2016 |
| TW | I604484 B | 11/2017 |
| TW | 201824318 A | 7/2018 |
| TW | I632577 B | 8/2018 |
| TW | I725894 | 4/2021 |
| TW | M613857 U | 7/2021 |
| TW | 202211278 A | 3/2022 |
| TW | I760181 B | 4/2022 |

OTHER PUBLICATIONS

Huang, the specification, including the claims, and drawings in the U.S. Appl. No. 18/127,667, filed Mar. 29, 2023.
Liu, the specification, including the claims, and drawings in the U.S. Appl. No. 18/297,020, filed Apr. 7, 2023.
Liu, the specification, including the claims, and drawings in the U.S. Appl. No. 18/128,235, filed Mar. 30, 2023.
Chen, the specification, including the claims, and drawings in the U.S. Appl. No. 18/128,261, filed Mar. 30, 2023.
Huang, the specification, including the claims, and drawings in the U.S. Appl. No. 18/330,342, filed Jun. 6, 2023.

* cited by examiner

BACKLIGHT KEYSWITCH AND BACKLIGHT MODULE THEREOF

CROSS REFERENCE TO RELATED APPLICATIONS

This application claims the benefit of U.S. Provisional Application No. 63/408,062, filed on Sep. 19, 2022. Further, this application claims the benefit of U.S. Provisional Application No. 63/408,069, filed on Sep. 19, 2022. The contents of these applications are incorporated herein by reference.

BACKGROUND OF THE INVENTION

1. Field of the Invention

The present invention relates to a backlight keyswitch and a backlight module thereof, and more specifically, to a backlight keyswitch having a protrusion structure protruding toward a light source to make more light enter a light guide panel for lateral transmission.

2. Description of the Prior Art

As technology advances, there are many types of keyboards in use. Users pay much more attention to visual effect of keyboard except basic input function while choosing keyboard. So far a lighting keyboard has been developed. The lighting keyboard attracts users in visual effect and can be used in darkness. When the lighting keyboard of the prior art applies a low luminous light emitting diode (LED) to illuminate each of square keyswitches, the following problems may occur: 1) the main symbol above the LED is over-illuminated and the corner symbol(s) of the keycap is too dark; 2) the surrounding outlet for the keycap peripheral is inconsistent; and 3) the overall illuminating consistency on a single square keyswitch and on plural keyswitches are both not good.

SUMMARY OF THE INVENTION

According to an embodiment, a backlight keyswitch provided by the present invention includes a keycap, a support plate, a membrane circuit board, and a backlight module. The support plate is disposed under the keycap. The membrane circuit board is disposed in parallel to the keycap and the support plate. The backlight module disposed under the support plate. The backlight module includes a shielding sheet, a light guide panel, a lighting board, and a protrusion structure. The shielding sheet has a light permeable area corresponding to the keycap. The light guide panel is disposed under the shielding sheet. The lighting board is disposed under the light guide panel and has a light source. The protrusion structure protrudes toward the light source and is formed on one of the support plate, the membrane circuit board and the shielding sheet. The protrusion structure reflects and scatters at least partial light of the light source to enter the light guide panel for lateral transmission. In an embodiment, the backlight module further includes a first reflective layer formed on the lighting board, and the first reflective layer is at least partially overlapped with the protrusion structure in a vertical direction. In an embodiment, the light guide panel has a light guide hole for accommodating the light source, and the first reflective layer is at least partially overlapped with the light guide hole in the vertical direction. In an embodiment, the backlight module further includes a second reflective layer formed on the shielding sheet, and the second reflective layer is at least partially overlapped with the protrusion structure in a vertical direction. In an embodiment, the support plate has a plurality of through holes surrounding the protrusion structure in a vertical direction. In an embodiment, the protrusion structure is located on the support plate, and the shielding sheet has an avoiding hole for accommodating the protrusion structure. In an embodiment, the protrusion structure is located on the membrane circuit board, and the support plate has a through hole for accommodating the protrusion structure.

According to another embodiment, a backlight module provided by the present invention is used for illuminating at least one keycap. The backlight module includes a shielding sheet, a light guide panel, a lighting board, and a protrusion structure. The shielding sheet has a light permeable area. The light guide panel is disposed under the shielding sheet. The lighting board is disposed under the light guide panel and has a light source. The protrusion structure is formed on the shielding sheet and protrudes toward the light source. The protrusion structure reflects and scatters at least partial light of the light source to enter the light guide panel for lateral transmission. In an embodiment, the backlight module further includes a first reflective layer formed on the lighting board, and the first reflective layer is at least partially overlapped with the protrusion structure in a vertical direction. In an embodiment, the light guide panel has a light guide hole for accommodating the light source, and the first reflective layer is at least partially overlapped with the light guide hole in the vertical direction. In an embodiment, the backlight module further includes an inner reflective area formed on the shielding sheet, and the inner reflective area is at least partially overlapped with the protrusion structure in a vertical direction. In an embodiment, the light guide panel has a light guide hole for accommodating the light source, and the inner reflective area is at least partially overlapped with the light guide hole in the vertical direction. In an embodiment, the backlight module further comprises an inner mask area formed above the inner reflective area, and the inner mask area is overlapped with the protrusion structure in the vertical direction. In an embodiment, the light guide panel has a light guide hole corresponding to the protrusion structure, and the light source is disposed in the light guide hole. In an embodiment, the backlight module further includes at least one adhesive layer at least partially surrounding the protrusion structure in a vertical direction. In an embodiment, the light guide panel has a light guide hole, and a non-adhesive area is disposed between the at least one adhesive layer and the light guide hole of the light guide panel. In an embodiment, the backlight module further includes a support frame disposed between the lighting board and the light guide panel, a bottom hole is formed on the support frame for accommodating the light source, and a limiting space is formed above the bottom hole for accommodating the light guide panel. In an embodiment, the backlight module further includes a micro-structure layer formed on the light guide panel or the lighting board. In an embodiment, the protrusion structure includes an upward-convex portion and a downward-convex portion, the downward-convex portion protrudes toward the light source, and the upward-convex portion protrudes away from the light source. In an embodiment, the upward-convex portion surrounds the downward-convex portion. In an embodiment, the protrusion structure further includes a side arc portion surrounding the upper protrusion portion.

According to anther embodiment, a backlight keyswitch provided by the present invention includes a keycap, a support plate, and a backlight module. The support plate is located under the keycap. The backlight module is disposed under the support plate and includes a shielding sheet, a light guide panel, a lighting board, a micro-structure layer and a protrusion structure. The shielding sheet has a light permeable area. The light guide panel is disposed under the shielding sheet. The lighting board is disposed under the light guide panel and has a light source. The micro-structure layer includes a plurality of micro-structures corresponding to the light permeable area of the shielding sheet. The micro-structure layer further defines a micro-structure clearance area surrounding the light source, and the plurality of micro-structures surrounds the micro-structure clearance area. The protrusion structure is formed on the shielding sheet and protrudes toward the light source. The protrusion structure is overlapped with the micro-structure clearance area, and the protrusion structure reflects and scatters at least partial light of the light source to enter the light guide panel for lateral transmission. In an embodiment, the support plate has a plurality of through holes, and the plurality of through holes is light-permeable and corresponds to the light permeable area of the shielding sheet. In an embodiment, the plurality of through holes has an inner portion respectively, and the inner portions of the plurality of through holes are at least partially overlapped with the micro-structure clearance area. In an embodiment, the backlight module further includes an adhesive layer located between the protrusion structure and the inner portions of the support plate. In an embodiment, the backlight module further includes an adhesive layer, and the micro-structure clearance area is at least partially located between the adhesive layer and the plurality of micro-structures. In an embodiment, the backlight module further includes an inner reflective area, the inner reflective area is formed on the shielding sheet and corresponds to the light source, and the micro-structure clearance area is at least partially located between the inner reflective area and the plurality of micro-structures.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
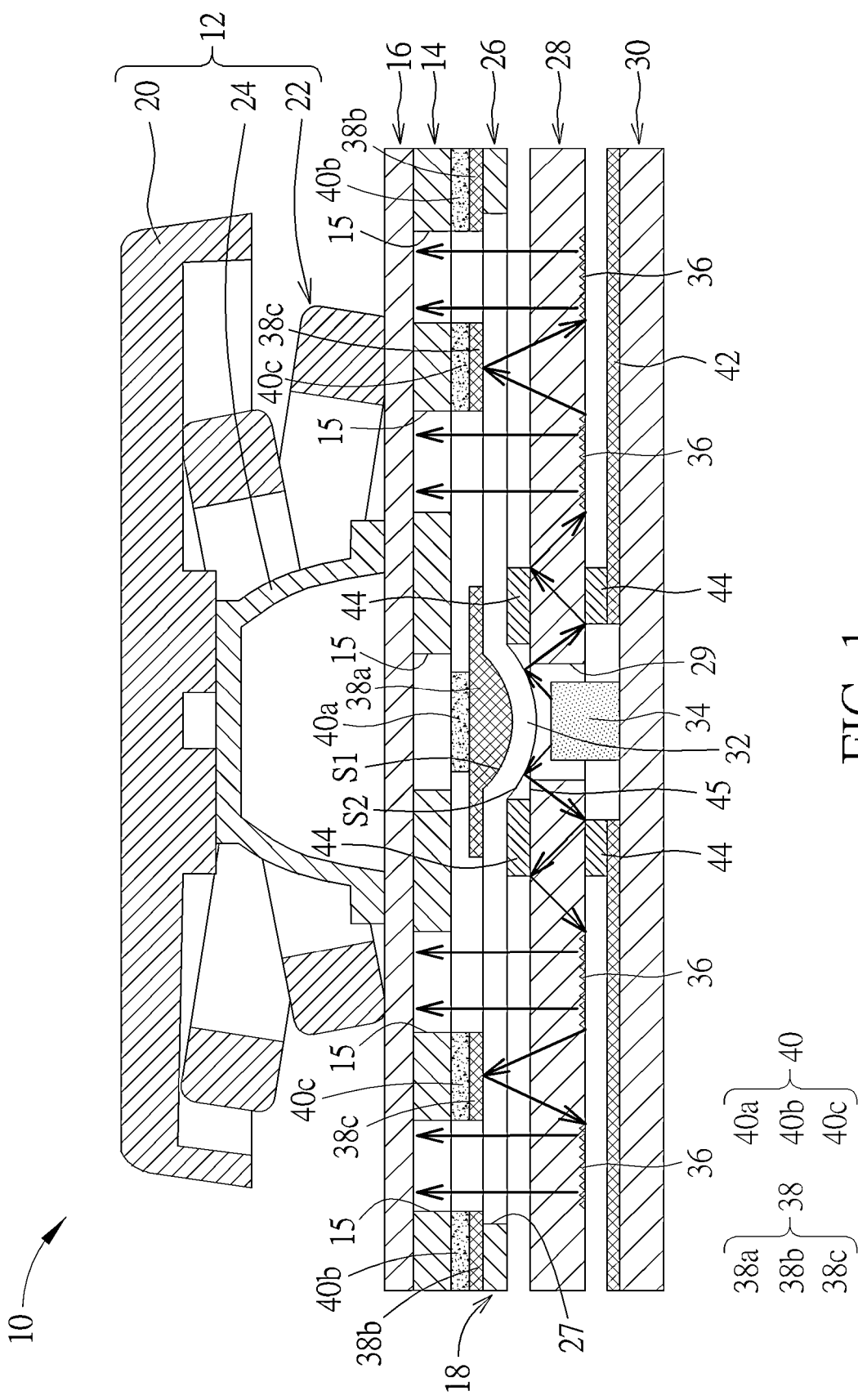
FIG. 1 is a cross-sectional diagram of a backlight keyswitch according to one embodiment of the present invention.

The present invention will now be described more specifically with reference to the following embodiments. The advantages and spirit of the invention can be further understood in view of the detailed descriptions and the accompanying drawings. The present invention can be implemented or applied to other different embodiments. Certain aspects of the present invention are not limited by the particular details of the examples illustrated herein. Without departing from the spirit and scope of the invention, the present invention will have other modifications and changes. It should be understood that the appended drawings are not necessarily drawn to scale and the configuration of each component (e.g., hole sizes, a size ratio of ink layers) in the drawings is merely illustrative, not presenting an actual condition of the embodiments. Components with identical names and/or numbers, which are both mentioned in each embodiment of the present invention, represents components with identical or similar structures or functions, and the related description is omitted for simplicity.

Each embodiment of the present invention is to increase the lateral transmission ratio of a light source, that is, to reduce the amount of light reaching main symbols on a keycap above the light source and increase the amount of light reaching side or corner symbol on the keycap. Low-power illuminant units such as mini LED or micro LED applied to low-stroke keyswitches have a short vertical light emitting distance (1-2 mm), while a target light emitting area (covering the main symbol/sub-symbol/keycap boundary halo) is large (about 10-12 mm). If the number and power of the illuminant units are not increased, purely optical manners must be used to prevent light from escaping. However, in a small space, how to make 80% of the light emitted upward from the illuminant unit to expand the light transmission angle so that most of the light can enter a light guide panel and transmit laterally is a big problem. Another problem is that if the light needs to pass through multiple reflections and diffusions around the illuminant unit to smoothly transfer the direction/angle of light transmission to the lateral transmission inside the light guide panel (must meet the critical angle of total reflection), the light will be needlessly lost in the initial light emitting stage of the illuminant unit. Thus, reducing initial light loss is another challenge.

Figure 2:
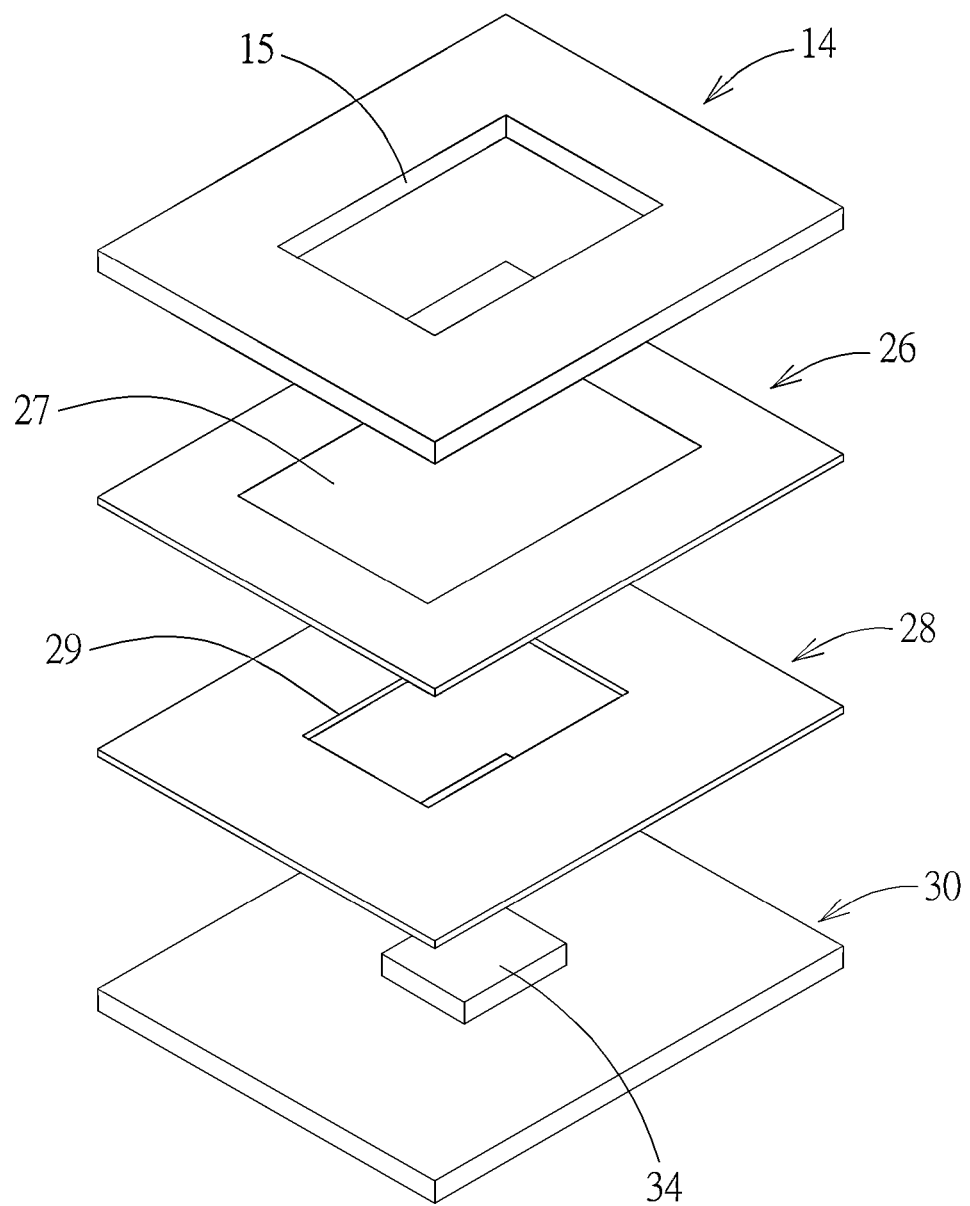
FIG. 2 is an exploded diagram of a support plate, a shielding sheet, a light guide panel, and a lighting board in FIG. 1.
Figure 10:
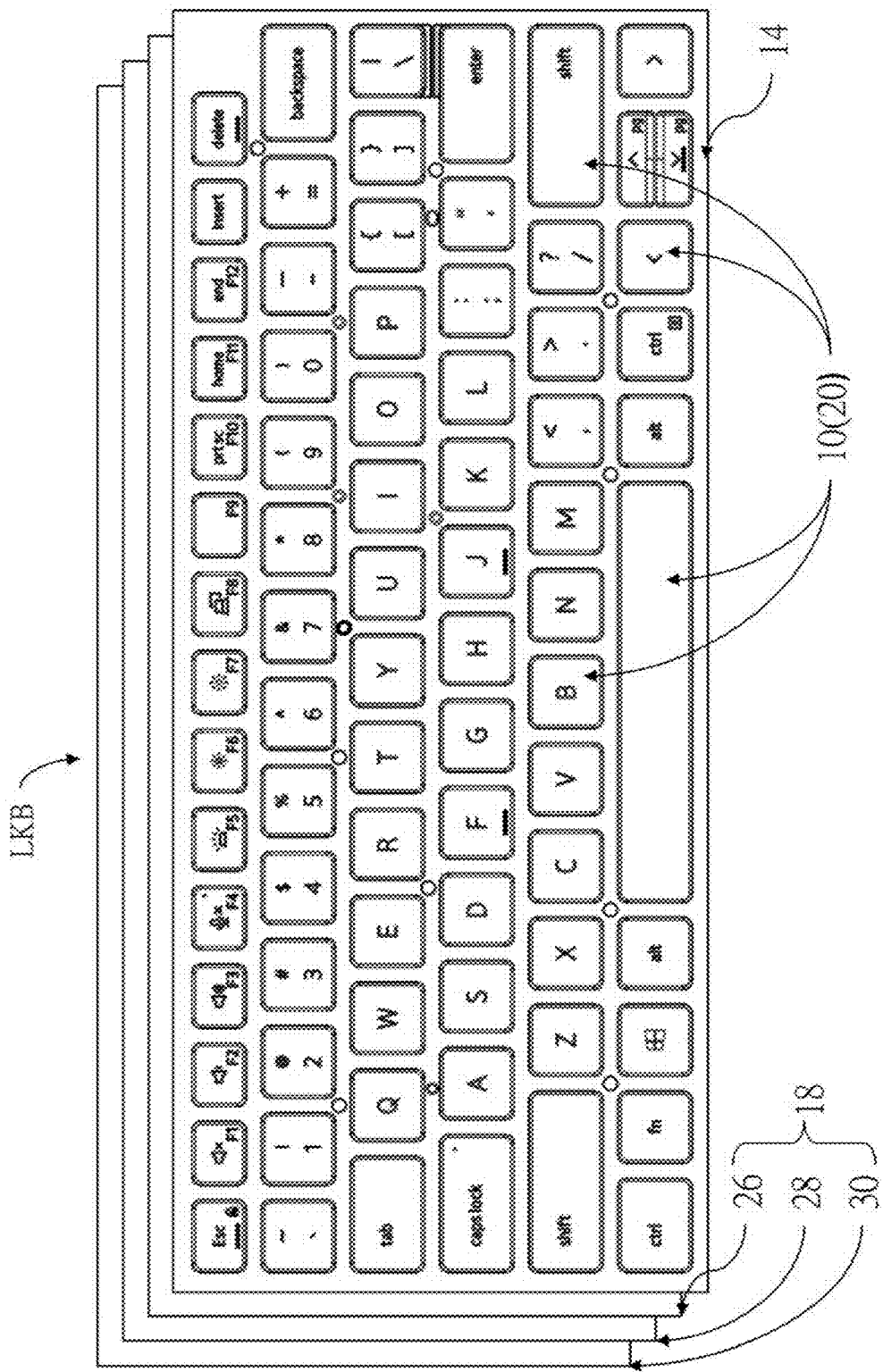
FIG. 10 is a stacking diagram of the backlight keyboard according to an embodiment of the present invention.

Please refer to FIG. 1 and FIG. 2. FIG. 1 is a cross-sectional diagram of a backlight keyswitch 10 according to one embodiment of the present invention. FIG. 2 is an exploded diagram of a support plate 14, a shielding sheet 26, a light guide panel 28, and a lighting board 30 in FIG. 1. FIG. 10 is a stacking diagram of the backlight keyboard 10 according to an embodiment of the present invention. The backlight keyswitch 10 could be more preferably applied to general electronic devices, such as a backlight keyboard LKB on a notebook or a keyboard device, but not limited thereto. The backlight keyswitch 10 provides a symbol lighting function, so that the user can identify and press to input text, numbers, symbols, or perform other functions. As shown in FIG. 1 and FIG. 2, the backlight keyswitch 10 includes a keyswitch body 12, the support plate 14, a membrane circuit board 16, and a backlight module 18. As shown in FIG. 1, the keyswitch body 12 could include a keycap 20, a lifting mechanism 22, and a returning member 24. The support plate 14 is disposed under the keyswitch body 12 and the keycap 20 and is connected to the keyswitch body 12 and the keycap 20 so that the keyswitch body 12 and the keycap 20 can move up and down relative to the support plate 14. The support plate 14 has one or more through holes 15 corresponding to the keyswitch body 12. When the support plate 14 is opaque (such as made of metal or opaque material), the through holes 15 can allow light from the backlight module 18 to pass therethrough and illuminate the keycap 20. The membrane circuit board 16 is disposed in parallel to the keycap 20 and the support plate 14 (e.g., between the keyswitch body 12 and the support plate 14 or under the support plate 14). The membrane circuit board 16 has a keyswitch circuit connected to a plurality of switches, each of which corresponds to one backlight keyswitch 10, and can generate a corresponding keyswitch signal when triggered. The lifting mechanism 22 is connected between the keycap 20 and the support plate 14. The lifting mechanism 22 can rotate and/or move to support the keycap 20 to move up and down. The returning member 24 has elasticity and can provide a returning force to return the keycap 20 to its original position when pressed. The keyswitch body 12 further includes a trigger portion disposed on a lower surface of one of the keycap 20, the returning member 24, or the lifting mechanism 22, and can trigger the switch of the membrane circuit board 16 with the up and down movement of the keycap 20 to generate a keyswitch signal.

In detail, the backlight module 18 is disposed under the keyswitch body 12, the keycap 20, and the support plate 14, and includes the shielding sheet 26, the light guide panel 28, the lighting board 30, and a protrusion structure 32. In a broad sense, the backlight module 18 could also include the support plate 14 and the membrane circuit board 16, because theoretically these multi-layer stacked structures can integrate circuits and components to reduce the total number of layers. To ensure that light escaping from the light guide panel 28 can be recycled to the light guide panel 28 for further transmission, the lighting board 30 and the shielding sheet 26 have a first reflective layer 42 and a second reflective layer 38 respectively facing upper and lower surfaces of the light guide panel 28.

The shielding sheet 26 is disposed between the support plate 14 and the light guide panel 28. For example, the aforesaid second reflective layer 38 could be disposed on a transparent substrate to reduce and/or prevent light from passing through specific positions. In light output positions of the keyswitch body 12 (e.g., symbols and light halos), the shielding sheet 26 does not have the second reflective layer 38 disposed thereon for forming a light permeable area 27. The second reflective layer 38 could be a white ink or paint layer, or could be implemented with a paint containing high-reflection particles or even a metal layer (or metal paint). The second reflective layer 38 usually has a reflectance of at least 15-20%. If necessary, the second reflective layer 38 could also have a considerable transmittance to allow partial light to pass therethrough. The second reflective layer 38 could include an inner reflection area 38a (block-shaped), an outer reflection area 38b (frame-shaped), and a rib reflection area 38c (if necessary). The light permeable area 27 surrounds the inner reflection area 38a and the outer reflection area 38b surrounds the light permeable area 27, so that the light permeable area 27 is surrounded by the inner reflection area 38a and the outer reflection area 38b. The outer reflection area 38b corresponds to inner and outer peripheral areas of the keycap 20 to avoid a user from seeing high-brightness points (e.g., micro-structures introduced later) under the through hole 15 of the support plate 14 via a seam around the keycap 20. The rib reflection area 38c is disposed between the inner reflection area 38a and the outer reflection area 38b, and is spaced apart by a distance. The inner reflection area 38a corresponds to an area covering a light source 34, which is to reflect the strongest light into the light guide panel 28 to avoid the over-brightness problem on main symbols of the keycap 20. This is advantageous to increase the brightness of side or corner symbols and improve the lighting uniformity of the backlight keyswitch 10. If necessary, the shielding sheet 26 could include a mask layer 40 to further block light passing through the second reflective layer 38. The mask layer 40 could be a black ink layer or a metal paint layer, and is formed on the second reflective layer 38 corresponding to the light source 34. The mask layer 40 could be divided into an inner mask area 40a, an outer mask area 40b, and a rib mask area 40c.

The light guide panel 28 is located under the shielding sheet 26, and the lighting board 30 is disposed under the light guide panel 28 and has the light source 34. The light guide panel 28 has a light guide hole 29 corresponding to the keyswitch body 12/keycap 20/light source 34. The light source 34 is disposed within the light guide hole 29 and includes one or more light emitting members (e.g., LEDs of different colors, but not limited thereto). The backlight module 18 further includes a micro-structure layer 36, which could be disposed in parallel to the light guide panel 28 and the lighting board 30. This micro-structure layer 36 corresponds to an area under main/sub symbols on the keycap 20. For example, the micro-structure layer 36 could be formed on the upper or lower surface of the light guide panel 28, an upper surface of the reflective layer of the lighting board 30, or independently between the light guide panel 28 and the lighting board 30. The micro-structure layer 36 is a scattering structure, such as metal paint/white paint micro-dots, concave and convex micro-dots, or linear concave and convex structures made of line segments or continuous lines.

Figure 4:
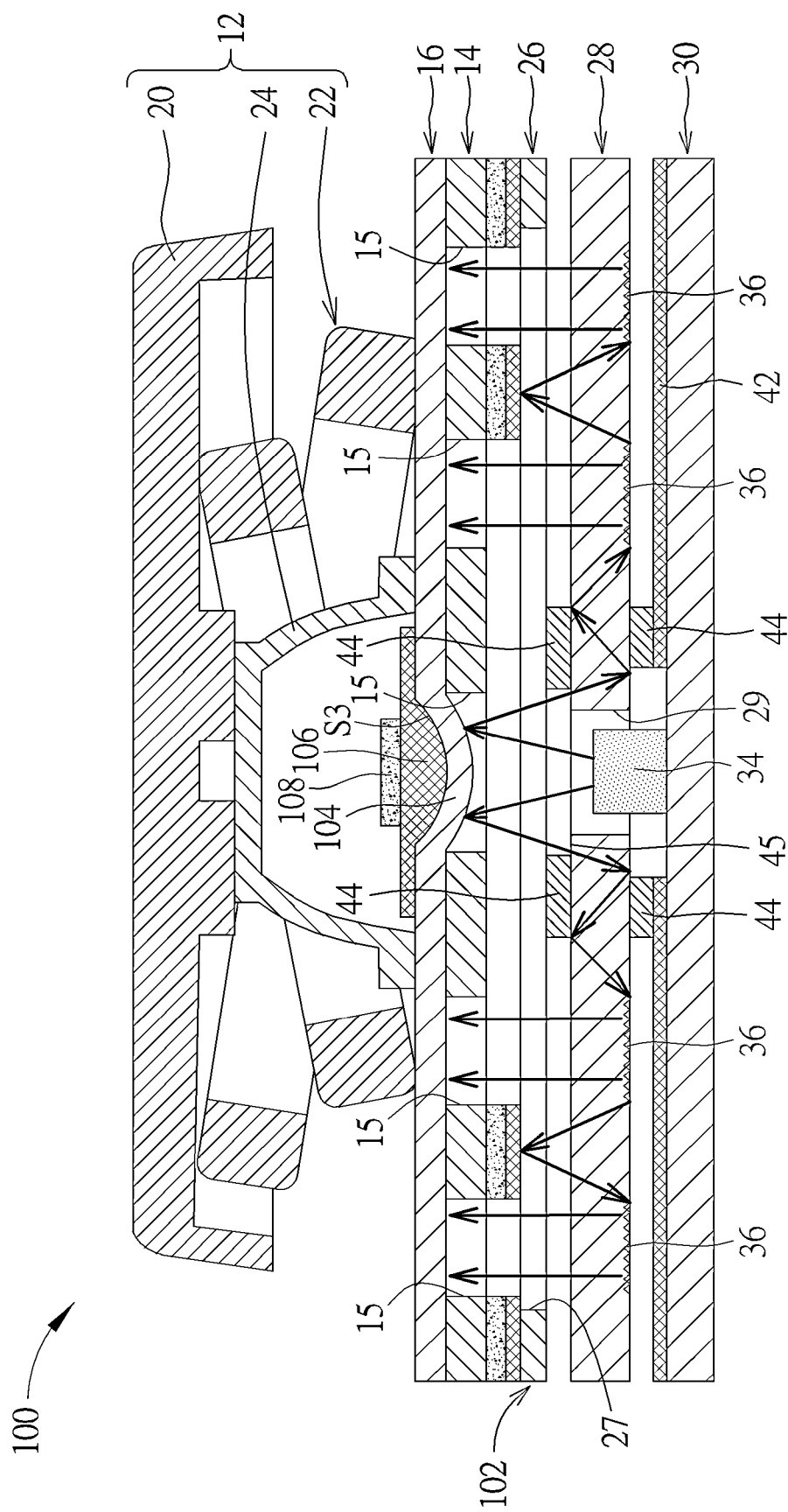
FIG. 4 is a cross-sectional diagram of a backlight keyswitch according to another embodiment of the present invention.

The protrusion structure 32 could be formed on the shielding sheet 26 and above the light source 34. The major purpose of forming the protrusion structure 32 is to scatter light to increase the light transmission angle (relative to a norm of a top surface of the light source 34), allowing more lateral light transmission to enter the light guide panel 28 in the initial light emitting stage for achieving lateral transmission of the light in the light guide panel via total reflection. In general, the protrusion structure 32 could be disposed on any component above the light source 34, such as the shielding sheet 26 (FIGS. 1 and 5), the support plate 14 (FIGS. 7 and 8), or the membrane circuit board 16 (FIG. 4). The protrusion structure 32 could be formed integrally with the shielding sheet 26, the support plate 14, or the membrane circuit board 16 (e.g., by die-stamping) or could be independently fixed to the surface of the shielding sheet 26, the support plate 14, or the membrane circuit board 16 (e.g., by printing or dotting paint, ink, or adhesive to form bumps). A height of the protrusion structures 32 could range from 18% to 95% of the thickness of the light guide panel 28.

The protrusion structure 32 extending toward the light source 34 goes against conventional wisdom. When using low-power light sources like mini LEDs or micro LEDs, the height of the light source 34 is significantly reduced, and the backlight module 18 along with its shielding sheet 26, light guide panel 28, and lighting board 30, have undergone a thinning process. Protruding toward the light source 34 may lead to an excessive thickness at the location of the light source 34, causing the top or bottom surface of the backlight module 18 to protrude. The backlight module 18 protruding downward means that the lighting board 30 protrudes downward at the location of the light source 34, bending the circuits on the lighting board 30 and potentially leading to detachment at the solder joints of the light source 34. Alternatively, the shielding sheet 26 may also protrude upward at the location of the light source 34. Whether the backlight module 18 protrudes upward or downward at the location of the light source 34, there may also be interference with the light source 34, which could damage the surface phosphor of the light source 34, leading to the color shift problem (e.g., white light shifting toward blue or a color shift phenomenon occurring in multi-color light mixing). The third issue is that if the protrusion structure 32 partially enters the light guide hole 29 in the light guide panel 28, it may force the light source 34 to shift its relative position, affecting the optical coupling mechanism between the light source 34 and the hole wall of the light guide hole 29. The fourth issue is that if the light guide hole 29 in the light guide panel 28 cannot fully accommodate the protrusion structure 32, the outer area of the protrusion structure 32 may cause unnecessary air gaps, leading to light scattering losses. However, resolving these issues means that the design of extending the protrusion structure 32 toward the light source 34 can be transformed into an advantageous solution.

Figure 3:
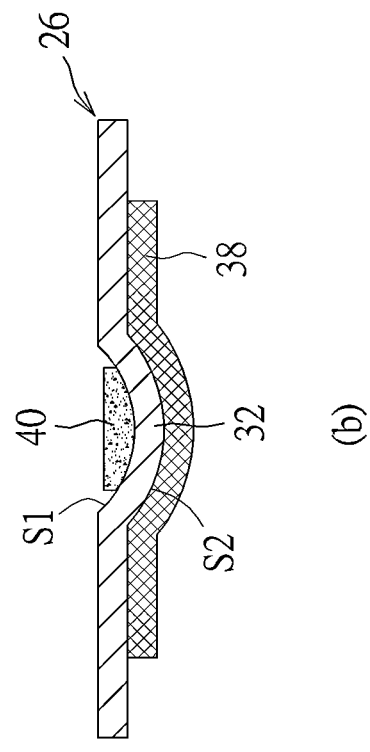
FIG. 3 shows different ink layer configurations according to different embodiments of the present invention.
Figure 3:
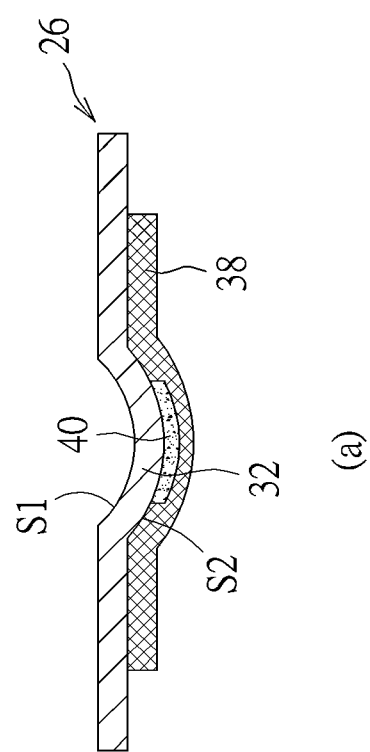

In FIG. 1, the protrusion structure 32 protrudes downward from a transparent substrate of the shielding sheet 26, or is formed at the same position as transparent or non-transparent convex points. The inner reflection area 38a and the inner mask area 40a of the shielding sheet 26 could overlap on an upper surface S1 or a lower surface S2 of the protrusion structure 32. In addition, the stacking configuration of the ink layers is not limited to the aforesaid embodiments, which means that the present invention could also adopt other ink layer stacking designs, and the size ratio, color, and type of ink layers may vary depending on the practical light emission application of the backlight module 18. For example, please refer to FIG. 3, which shows different ink layer configurations according to different embodiments of the present invention. As shown in FIG. 3(a), the second reflective layer 38 (the inner reflection area 38a) could be formed on the lower surface S2 of the protrusion structure 32, and the mask layer 40 (the inner mask area 40a) could be formed between the second reflective layer 38 (the inner reflection area 38a) and the lower surface S2 of the protrusion structure 32; as shown in FIG. 3(b), the second reflective layer 38 (the inner reflection area 38a) could be formed on the lower surface S2 of the protrusion structure 32, and the mask layer 40 (the inner mask area 40a) could be formed on the upper surface S1 of the protrusion structure 32. The scattering effect of the protrusion structure 32 could be generated by the second reflective layer 38 (the inner reflection area 38a) or the protrusion structure 32 itself. A smooth or rough arc surface of the protrusion structure 32 or the design that the protrusion structure 32 is made of reflective material can make the protrusion structure 32 provide the scattering effect by itself without the second reflective layer 38 (the inner reflection area 38a). The protrusion structure 32 could have one or more convex points or form a convex/concave dot area, and the protrusion structure 32 could be closely disposed within a light emission range of the light source 34, such as a horizontal 360-degree and vertical 120-degree elliptical hemisphere.

Moreover, the present invention could further adopt an adhesive layer design. For example, as shown in FIG. 1, the backlight module 18 could further include at least one adhesive layer 44. FIG. 1 shows one adhesive layer 44 attached between the shielding sheet 26 and the light guide panel 28, and this adhesive layer 44 at least partially surrounds the protrusion structure 32, the light guide hole 29, and the light source 34. FIG. 1 also shows another adhesive layer 44 attached between the light guide panel 28 and the first reflective layer 42, and this adhesive layer 44 also at least partially surrounds the protrusion structure 32, the light guide hole 29, and the light source 34. The aforesaid adhesive layer 44 is parallel to the shielding sheet 26, parallel to the light guide panel 28, and also parallel to the lighting board 30. Between the adhesive layer 44 and the light guide hole 29 of the light guide panel 28, a non-adhesive area 45 could be preferably disposed to avoid the adhesive layer 44 from entering the light guide hole 29 of the light guide panel 28 and sticking to the light source 34 during the manufacturing process, causing excessive light emission or causing the light source 34 to fall off. The non-adhesive area 45 could be disposed on the upper surface of the light guide panel 28 (or between the light guide panel 28 and the shielding sheet 30), or the non-adhesive area 45 could also be disposed on the lower surface of the light guide panel 28 (or between the light guide panel 28 and the lighting board 32). The adhesive layer 44 has a good light coupling effect. Via the aforesaid adhesive layer design, light from the light source 34 can smoothly reach the medium at the other side of the adhesive layer 44 when the light is directly or indirectly incident to the adhesive layer 44, so that the light can be reflected between the second reflective layer 38 and the first reflective layer 42 and then guided back to the light guide panel 28 after being emitted from the light guide panel 28. As such, the present invention can avoid light loss in an air gap between the light guide panel 28 and the shielding sheet 26 or in another air gap between the light guide panel 28, the lighting board 30 and the first reflective layer 42. In such a manner, the present invention ensures that a sufficient proportion of light can continue to be transmitted laterally to farther positions in the light guide panel 28.

Via the aforesaid configuration, the protrusion structure 32 can scatter light to expand the light transmission angle (relative to the norm of the top surface of the light source 34), increase the lateral light transmission, and allow more light to enter the light guide panel 28 for lateral transmission in the initial light emitting stage. Furthermore, via the light coupling effect of the adhesive layer 44 surrounding the protrusion structure 32, the initially scattered light can be guided back into the light guide panel 28. Moreover, the light escaping from the upper and lower surfaces of the light guide panel 28 can be reflected back to the light guide panel 28 by the first reflective layer 42 and the second reflective layer 38, thereby ensuring as much as possible that more light can reach the sides and corners of the keycap 20. At this time, the micro-structure layer 36 (as shown in FIG. 1) can scatter the light upward to pass through the light guide panel 28. As such, the light can continue to pass through the light permeable area 27 of the shielding sheet 26, the through hole 15 of the support plate 14, and the membrane circuit board 16, and then be emitted from the keycap 20, thereby generating the symbol lighting effect and the surrounding halo effect of the keycap 20 and achieving a preferable lighting uniformity.

In summary, the present invention adopts the design in which the protrusion structure is overlapped with and protrudes toward the light source, to reflect and scatter light of the light source in the initial light emitting stage, thereby expanding the light transmission angle, increasing the lateral light transmission, and increasing the amount of light entering the light guide panel 28. In such a manner, the present invention not only avoids the excessive brightness of middle symbols, but also increases the brightness of side or corner symbols, so as to greatly improve the lighting uniformity and the visual effect of the backlight keyswitch in use.

It should be mentioned that the forming position of the protrusion structure is not limited to the aforesaid embodiments. For example, please refer to FIG. 4, which is a cross-sectional diagram of a backlight keyswitch 100 according to another embodiment of the present invention. As shown in FIG. 4, the backlight keyswitch 100 includes the keyswitch body 12, the support plate 14, the membrane circuit board 16, and a backlight module 102. The backlight module 102 could include the shielding sheet 26, the light guide panel 28, the lighting board 30, and a protrusion structure 104. In this embodiment, the protrusion structure 104 is formed on the membrane circuit board 16 and protrudes toward the light source 34 for reflecting and scattering light in the initial light emitting stage, so as to expand the light transmission angle and increase the lateral light transmission and the amount of light entering the light guide panel 28. As such, the aforesaid lighting uniformity and the visual effect can be achieved.

The light reflection and scattering effects of the protrusion structure 104 could occur at a position farther from the light source 34. In this embodiment, the backlight module 102 could further include a second reflective layer 106 (similar to the inner reflection area 38a in FIG. 1) formed on the membrane circuit board 16 corresponding to the light source 34. The second reflective layer 106 could be preferably a white ink layer. To be more specific, as shown in FIG. 4, the second reflective layer 106 is formed on an upper surface S3 of the protrusion structure 104. In practical application, for preventing partial light from passing through the second reflective layer 106 to be directly incident to the keyswitch body 12, the backlight module 102 could include a mask layer 108. This mask layer 108 could be preferably a black ink layer or metal paint layer and could be formed on the second reflective layer 106 corresponding to the light source 34, for preventing light that passes through the second reflective layer 106 from being incident to a main symbol on the keycap 20. Accordingly, the excessive brightness problem on the main symbol can be further improved. As for other related description for this embodiment (e.g., the reflective ink layer design, the mask layer design, and the adhesive layer design), it could be reasoned by analogy according to the aforesaid embodiments and omitted herein.

Figure 5:
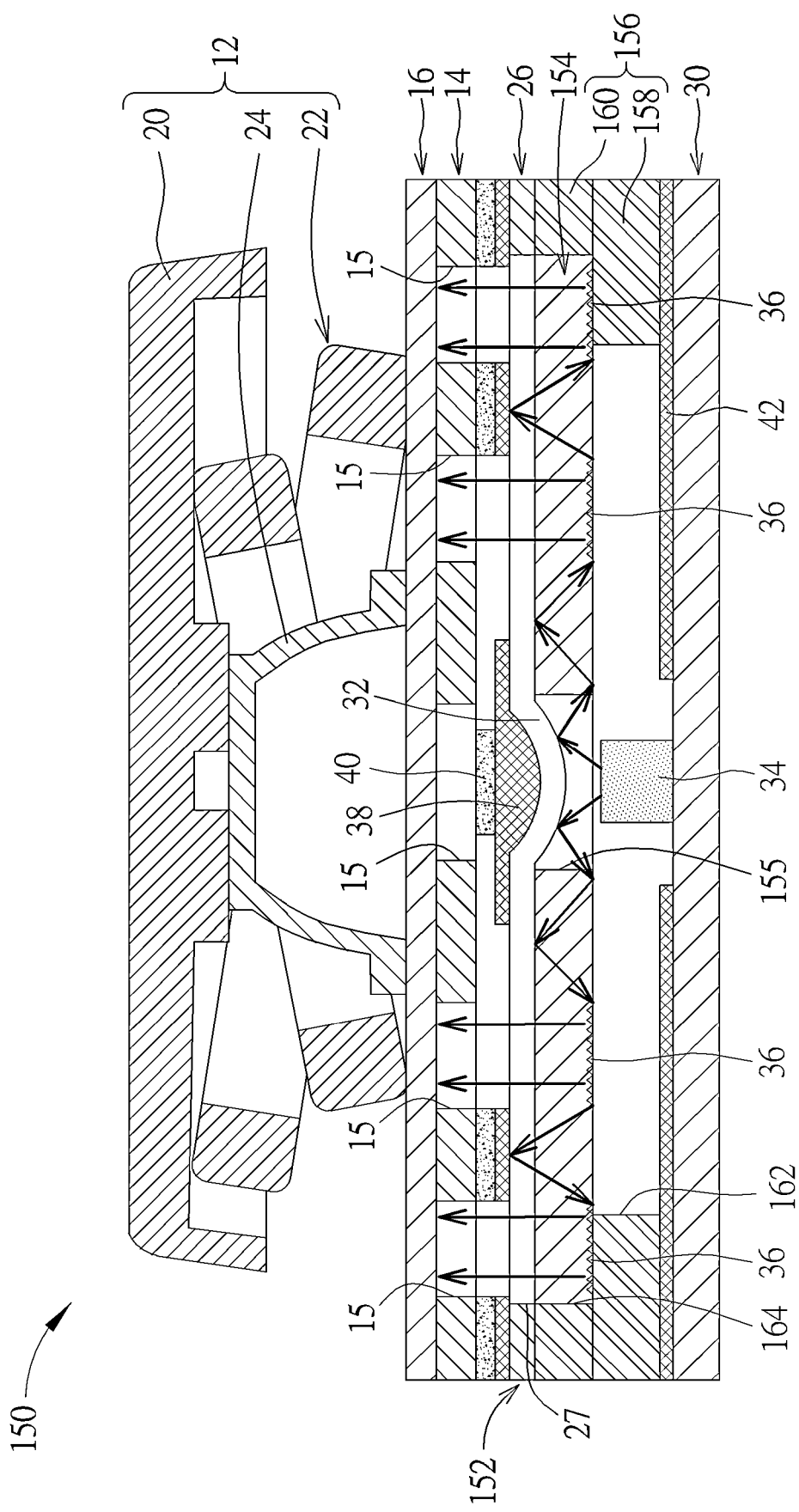
FIG. 5 is a cross-sectional diagram of a backlight keyswitch according to another embodiment of the present invention.
Figure 6:
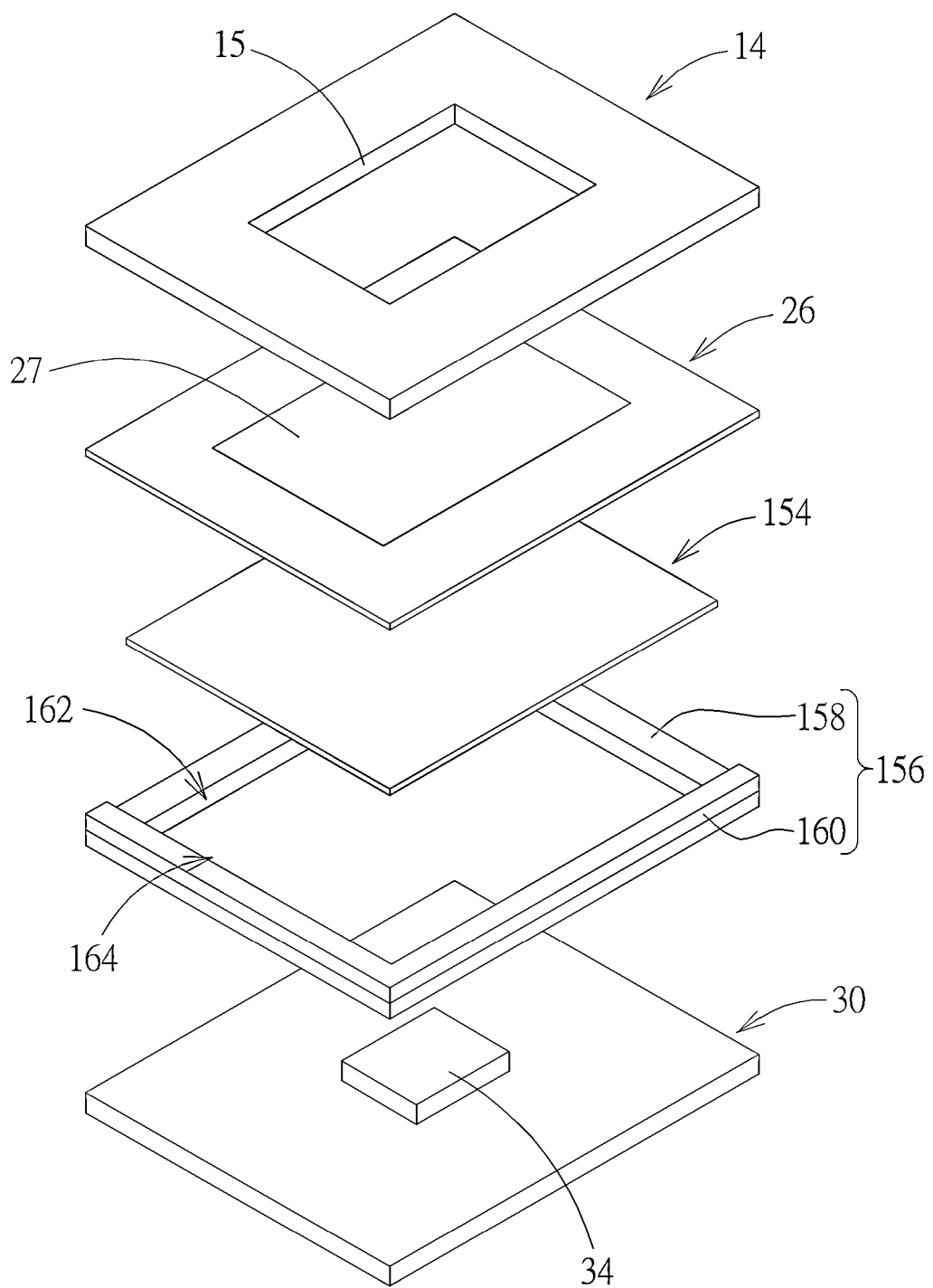
FIG. 6 is an exploded diagram of the support plate, the shielding sheet, a light guide panel, a support frame, and the lighting board in FIG. 5.

Moreover, the present invention could adopt another stacking design of the light guide panel and the lighting board to accommodate the protrusion structure for preventing excessive protrusion of the protrusion structure, so as to ensure the overall flatness and strength of the backlight module 18. On the other hand, the aforesaid design also reduces interference between the protrusion structure and the light source and avoids any influence on attachment of the light source or damage to the phosphor of the light source. Please refer to FIGS. 5 and 6. FIG. 5 is a cross-sectional diagram of a backlight keyswitch 150 according to another embodiment of the present invention. FIG. 6 is an exploded diagram of the support plate 14, the shielding sheet 26, a light guide panel 154, a support frame 156, and the lighting board 30 in FIG. 5. The backlight keyswitch 150 includes the keyswitch body 12, the support plate 14, the membrane circuit board 16, and a backlight module 152. The backlight module 152 could include the shielding sheet 26, the lighting board 30, the protrusion structure 32, the light guide panel 154, and the support frame 156. The light guide panel 154 could have a light guide hole 155 corresponding to the protrusion structure 32. The support frame 156 is disposed between the lighting board 30 and the light guide panel 154 and has a bottom hole 162 to accommodate the light source 34. A limiting space 164 is formed above the bottom hole 162 to position the light guide panel 154 at a relatively higher position above the light source 34. The support frame 156 is preferably composed of a base frame 158 with the bottom hole 162 and a limiting frame 160 with the limited space 164 (but not limited thereto). If the present invention is further applied to a backlight keyboard, the base frame 158 could adopt a grid-like design with plural bottom holes 162 to accommodate the light sources 34 on the lighting board 30. The limiting frame 160 could adopt a peripheral ring-shaped design to be stacked on the base frame 158 for forming the limiting space 164 to accommodate the entire light guide panel 154.

Via the aforesaid configuration, the protrusion structure 32 can keep a safer distance away from the light source 34, thereby avoiding problems caused by interference between the protrusion structure 32 and the light source 34. At the same time, a height of the light source 34 can be significantly reduced, so as to lower the top surface of the light source 34 with a higher light emission proportion from being close to the bottom surface of the shielding sheet 26 or near the top surface of the light guide panel 28 (as shown in FIG. 1) down to be located near the bottom surface of the light guide panel 28 in FIG. 5. As such, this greater distance between the protrusion structure 32 and the light source 34 can expand the light transmission angle and increase the lateral light transmission, thereby enhancing uniformity of the symbol lighting effect and the surrounding halo effect of main/sub symbols on the keycap 20 and achieving a preferable visual effect. As for other related description for this embodiment (e.g., the forming position of the protrusion structure, the reflective layer design, the mask layer design, and the adhesive layer design), it could be reasoned by analogy according to the aforesaid embodiments and omitted herein.

Figure 7:
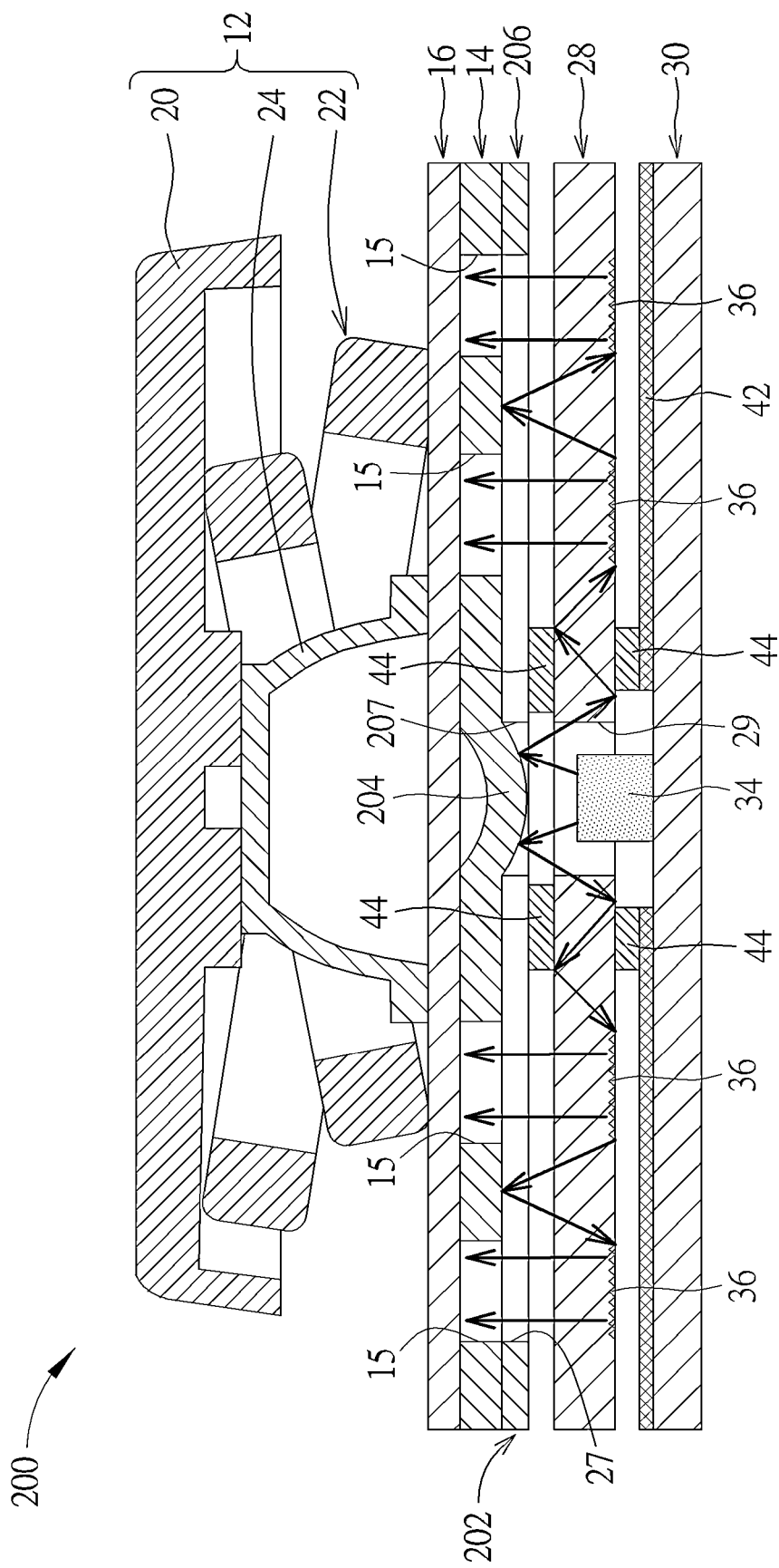
FIG. 7 is a cross-sectional diagram of a backlight keyswitch according to another embodiment of the present invention.

In practice, the present invention could directly form the protrusion structure on the support plate, allowing the protrusion structure to maintain a safe distance from the light source. For example, please refer to FIG. 7, which is a cross-sectional diagram of a backlight keyswitch 200 according to another embodiment of the present invention. As shown in FIG. 7, the backlight keyswitch 200 includes the keyswitch body 12, the support plate 14, the membrane circuit board 16, and a backlight module 202. The backlight module 202 could include the light guide panel 28, the lighting board 30, a protrusion structure 204, and a shielding sheet 206. In this embodiment, the protrusion structure 204 could be formed on the support plate 14 (preferably by a downward stamping process, but not limited thereto) and protrude toward the light source 34. The shielding sheet 206 could have the light permeable area 27 and form an avoiding hole 207 corresponding to the protrusion structure 204. Via the aforesaid configuration, the protrusion structure 204 of the support plate 14 can maintain a safe distance from the light source 34, thereby avoiding problems caused by interference between the protrusion structure 204 and light source 34. At the same time, the height of the light source 34 can be significantly reduced, so as to lower the top surface of the light source 34 with a higher light emission proportion from being close to the bottom surface of the shielding sheet 26 or near the top surface of the light guide panel 28 (as shown in FIG. 1) down to being located between the top surface and the bottom surface of the light guide panel 28 in FIG. 7. As such, this greater distance between the protrusion structure 204 and the light source 34 can expand the light transmission angle and increase the lateral light transmission, thereby enhancing uniformity of the symbol lighting effect and the surrounding halo effect of the main/sub symbols on the keycap 20 and achieving a preferable visual effect. As for other related description for this embodiment (e.g., the reflective layer design, the mask layer design, and the adhesive layer design), it could be reasoned by analogy according to the aforesaid embodiments and omitted herein.

Figure 8:
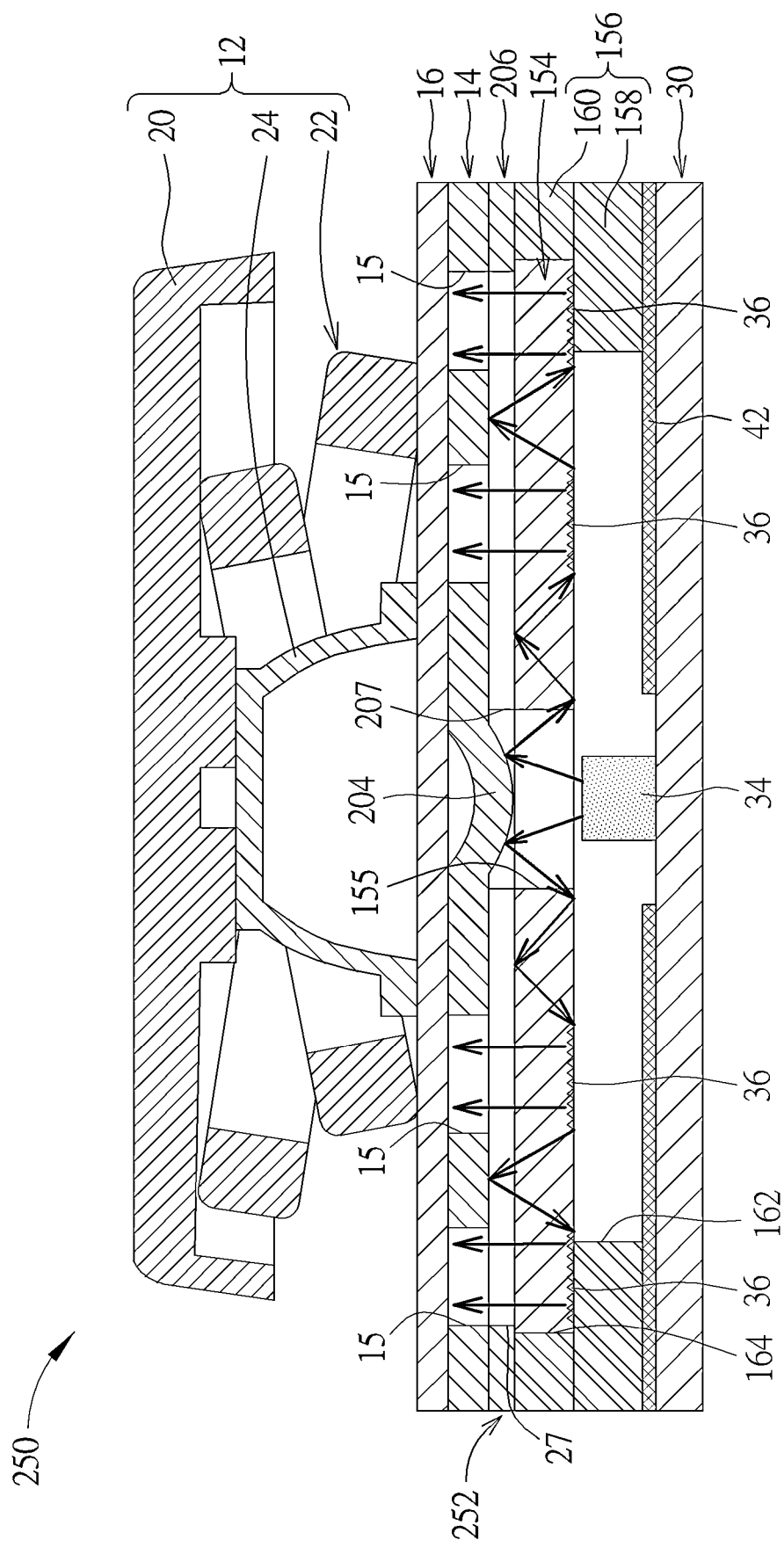
FIG. 8 is a cross-sectional diagram of a backlight keyswitch according to another embodiment of the present invention.

Furthermore, the aforesaid support frame design as shown in FIG. 5 could also be applied to the embodiment that the support plate has the protrusion structure. For example, please refer to FIG. 8, which is a cross-sectional diagram of a backlight keyswitch 250 according to another embodiment of the present invention. As shown in FIG. 8, the backlight keyswitch 250 includes the keyswitch body 12, the support plate 14, the membrane circuit board 16, and a backlight module 252. The backlight module 252 could include the lighting board 30, the light guide panel 154, the support frame 156, the protrusion structure 204, and the shielding sheet 206. The support frame 156 is disposed between the lighting board 30 and the light guide panel 154. The bottom hole 162 is formed on the support frame 156 to accommodate the light source 34, and the limiting space 164 is formed above the bottom hole 162 to accommodate the light guide panel 154, so as to position the light guide panel 154 at a relatively higher position above the light source 34. The light guide panel 154 could have the light guide hole 155 corresponding to the protrusion structure 204, and the shielding sheet 206 could have the light permeable area 27 and form the avoiding hole 207 corresponding to the protrusion structure 204. Via the aforesaid configuration, the protrusion structure 204 can maintain a safe distance from the light source 34, thereby avoiding problems caused by interference between the protrusion structure 204 and light source 34. At the same time, the height of the light source 34 can be significantly reduced, so as to lower the top surface of the light source 34 with a higher light emission proportion down to being near the bottom surface of the light guide panel 154 in FIG. 8. As such, this greater distance between the protrusion structure 204 and the light source 34 can expand the light transmission angle and increase the lateral light transmission, thereby enhancing uniformity of the symbol lighting effect and the surrounding halo effect of the main/sub symbols on the keycap 20 and achieving a preferable visual effect. As for other related description for this embodiment (e.g., the reflective layer design, the mask layer design, and the adhesive layer design), it could be reasoned by analogy according to the aforesaid embodiments and omitted herein.

Figure 9:
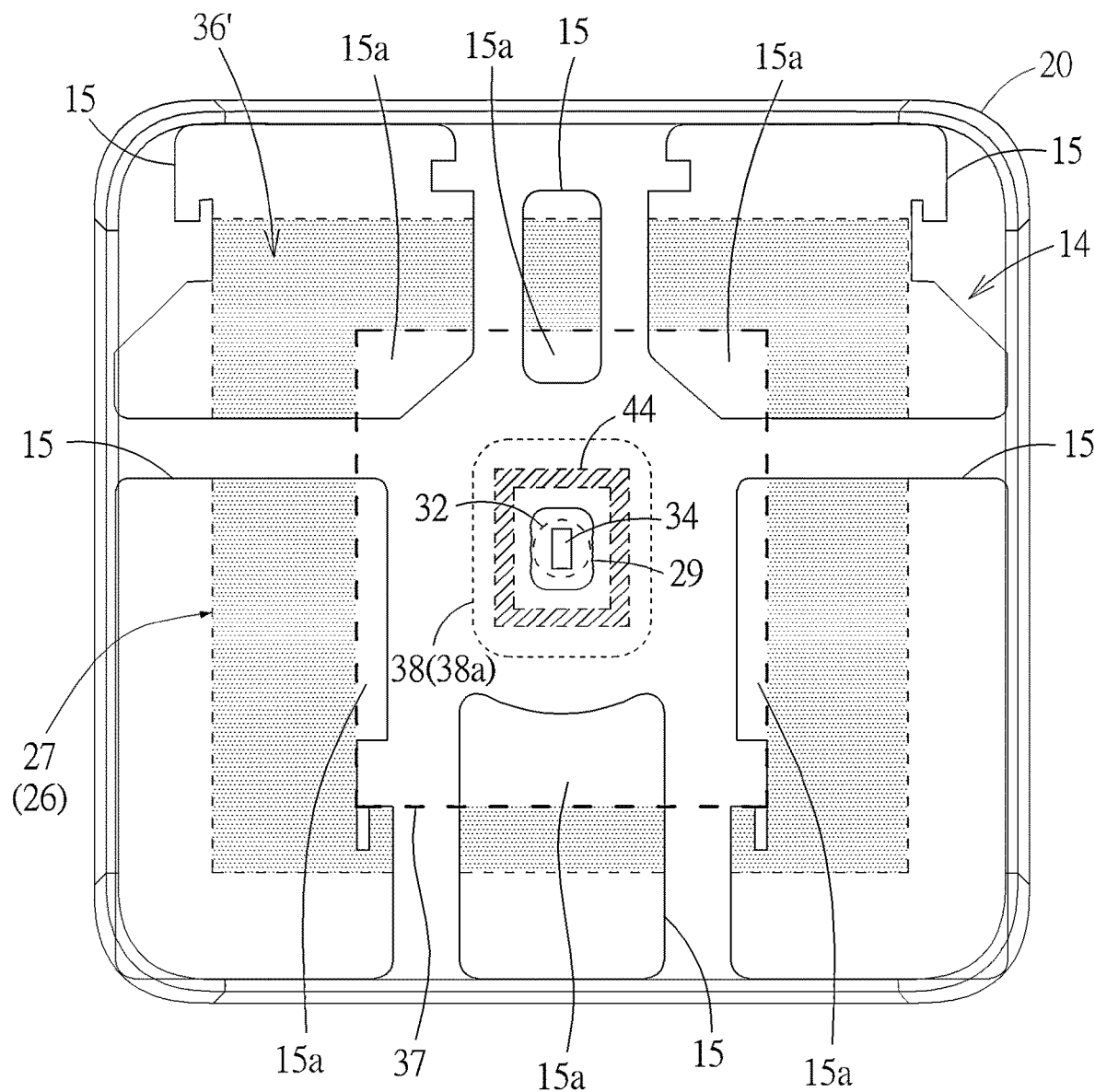
FIG. 9 is a top perspective view of the keycap, the support plate, the light source, and a micro-structure layer according to another embodiment of the present invention.

In practical application, in order to further improve the excessive brightness problem on the middle symbols, the present invention could adopt a micro-structure clearance design. For example, please refer to FIG. 9, which is a top perspective view of the keycap 20, the support plate 14, the light source 34, and a micro-structure layer 36' according to another embodiment of the present invention. As shown in FIG. 9, the backlight module of the present invention could include the micro-structure layer 36' formed corresponding to the light permeable area 27 of the shielding sheet 26 (indicated by dashed lines in FIG. 9). The micro-structure layer 36' guides light from the light guide panel 28 to pass through the light permeable area 27 and illuminate the keycap 20. The micro-structure layer 36' defines a micro-structure clearance area 37 centered at the light source 34 (shown as a rectangular area in FIG. 9, but not limited thereto, meaning that the present invention could also adopt other shape designs, such as a circular area). The micro-structure clearance area 37 at least covers inner portions 15a of the through holes 15 of the support plate 14, preventing light from emitting out of the inner portions 15a of the through holes 15 via the micro-structure layer 36'. The micro-structure layer 36' could be parallel to the light guide panel 28 (e.g., formed on the upper or lower surface of the light guide panel 28, but not limited thereto, meaning that the micro-structure layer 36' could also be formed on the lighting board 30) and adopt a dot structure design (but not limited thereto, meaning that the present invention could adopt other optical scattering designs, such as a metallic paint/white paint design, a concave/convex micro-dot structure design, or a continuous linear micro-structure design). The micro-structure layer 36' adopts a configuration in which micro-structures are removed within the micro-structure clearance area 37. In this way, via the micro-structure clearance design, the present invention can reduce light directly illuminating the keycap 20 from the light source 34, so as to solve the prior art problem that the light emitted upward by the LED is directly incident to the backlight keyswitch to cause the uneven brightness uniformity of the symbols on the backlight keyswitch. Thus, the present invention can greatly improve the lighting uniformity and the visual effect of the backlight keyswitch in use. In addition, the protrusion structure 32 and the adhesive layer 44 mentioned in the aforesaid embodiments can overlap with the micro-structure clearance area 37, or the inner portions 15a of the through holes 15 covered by the micro-structure clearance area 37 can surround the protrusion structure 32 and the adhesive layer 44, so as to further enhance the overall lighting uniformity and the visual effect of the symbol and its outline halo on the keycap 20.

Figure 11:
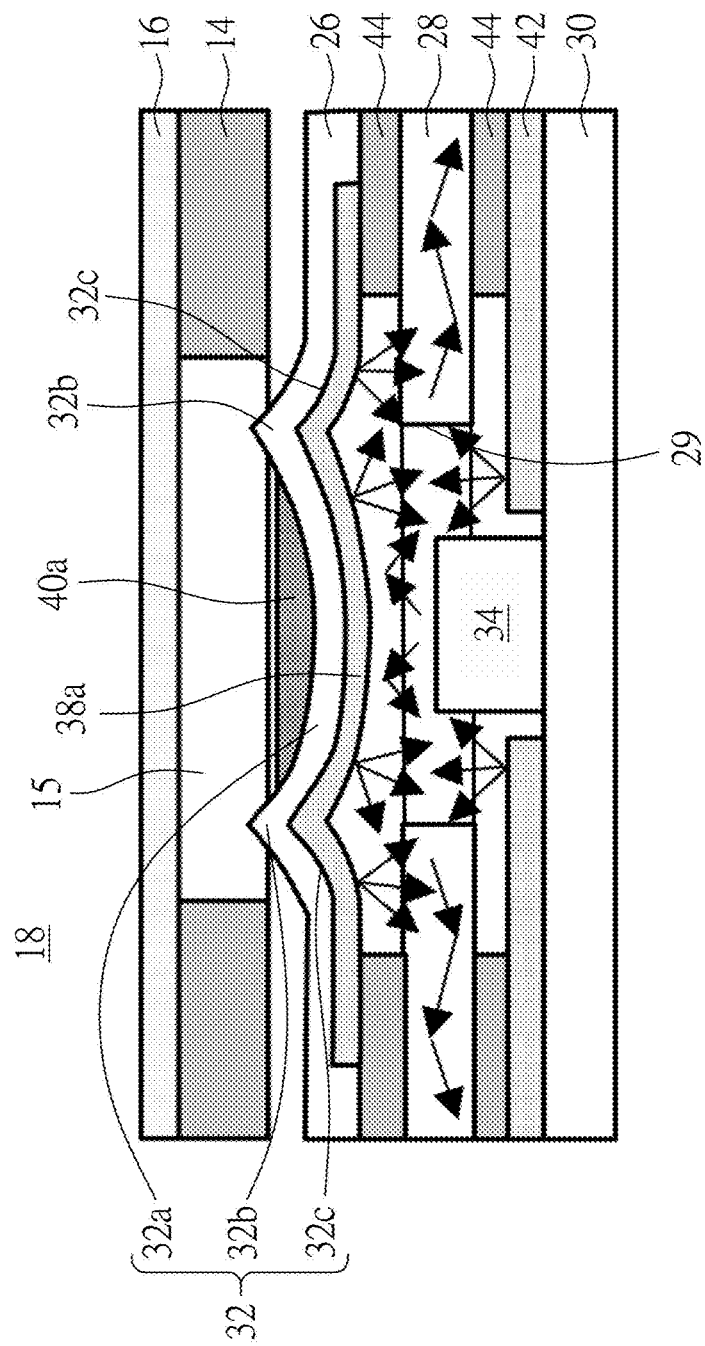
FIG. 11 is a partial cross-sectional diagram of a backlight module according to another embodiment of the present invention.

The protruding structure could have upward-convex and downward-convex portions at the same time. For example, the downward-convex portion is formed by mold stamping, and the downward-convex portion may be pushed up by the light source during assembly, causing the annular turning portion of the protruding structure to become the upward-convex portion by moving upward with the downward-convex portion. Alternatively, to avoid interference between the protruding structure and the light source, the stamping mold could be deliberately designed to form the aforesaid upward-convex and downward-convex portions in one stamping process. Please refer to FIG. 11, which is a partial cross-sectional diagram of a backlight module according to another embodiment of the present invention. The protrusion structure 32 of the backlight module 18 is formed on the shielding sheet 26. In addition to having a downward-convex portion 32a, the protrusion structure 32 also has upward-convex portions 32b, which are two protruding pointed portions in FIG. 11, surrounding the downward-convex portion 32a. The inner reflective area 38a and the inner mask area 40a on the shielding sheet 26 could protrude up or down with the downward-convex portion 32a and the upward-convex portions 32b or could not protrude at all, which depends on different sizes. The downward-convex portion 32a may still partially enter the light guide hole 29, or may not enter the light guide hole 29 at all and maintain a certain distance from the light source 34. The upward-convex portions 32b may partially enter the through hole 15 of the support plate 14, or may not be higher than the lower surface of the support plate 14. The protrusion structure 32 further includes a side arc portion 32c surrounding the upward-convex portions 32b, which is an arc-shaped surface formed together with the upward-convex portions 32b. The downward-convex portion 32a and the side arc portion 32c overlap with the inner reflective area 38a of the second reflective layer 38. The inner reflective area 38a could be located on the lower or upper surface of the transparent substrate of the shielding sheet 26. Furthermore, there is the adhesive layer 44 surrounding the side arc portion 32c, which reduces light from escaping in the air gap between the shielding sheet 26 and the light guide panel 28 or escaping in the air gap between the light guide panel 28 and the lighting board 30. The side arc portion 32c protrudes toward the light source 34 and could be regarded as an additional downward-convex portion 32a, so as to increase the overall protruding arc surface area of the protrusion structure 32 toward the light source 34. The downward-convex portion 32a and the side arc portion 32c in combination with the inner reflective area 38a, can form a structure similar to a convex lens. Moreover, the first reflective layer 42 of the lighting board 30 at least partially enters the light guide hole 29 of the light guide panel 28, surrounds the light source 34 in the light guide hole 29, and at least partially overlaps with the protrusion structure 32 and the light guide hole 29. As such, in the initial light emitting stage, light reflected downward from the protrusion structure 32 can be further reflected and scattered by the first reflective layer 42, and light reflected upward from the first reflective layer 42 can also be further reflected and scattered by the protrusion structure 32, so as to allow more light to be incident into the light guide panel 28 directly and laterally via the hole wall of the light guide panel 29. In this way, the light just emitted from the light source 34 can be reflected and scattered, thereby expanding the light transmission angle and allowing more lateral light transmission, so that more light can enter the light guide panel 28 in the initial light emitting stage and can be transmitted laterally in the light guide panel 28 through total reflection. In such a manner, the present invention can enhance the lighting uniformity and the visual effect of the main/sub symbols and their outline halos on the keycap 20.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A backlight keyswitch comprising:
   a keycap;
   a support plate disposed under the keycap;
   a membrane circuit board disposed in parallel to the keycap and the support plate; and
   a backlight module disposed under the support plate, the backlight module comprising:
      a shielding sheet having a light permeable area corresponding to the keycap;
      a light guide panel disposed under the shielding sheet;
      a lighting board disposed under the light guide panel and having a light source; and
      a protrusion structure protruding toward the light source relative to a norm of a top surface of the light source and formed on the shielding sheet, the protrusion structure reflecting and scattering at least partial light of the light source to enter the light guide panel for lateral transmission.

2. The backlight keyswitch of claim 1, wherein the backlight module further comprises a first reflective layer formed on the lighting board, and the first reflective layer is at least partially overlapped with the protrusion structure in a vertical direction.

3. The backlight keyswitch of claim 2, wherein the light guide panel has a light guide hole for accommodating the light source, and the first reflective layer is at least partially overlapped with the light guide hole in the vertical direction.

4. The backlight keyswitch of claim 1, wherein the backlight module further comprises a second reflective layer formed on the shielding sheet, and the second reflective layer is at least partially overlapped with the protrusion structure in a vertical direction.

5. The backlight keyswitch of claim 1, wherein the support plate has a plurality of through holes surrounding the protrusion structure in a vertical direction.

6. A backlight module for illuminating at least one keycap, the backlight module comprising:
   a shielding sheet having a light permeable area;
   a light guide panel disposed under the shielding sheet;
   a lighting board disposed under the light guide panel and having a light source; and
   a protrusion structure formed on the shielding sheet and protruding toward the light source relative to a norm of a top surface of the light source, the protrusion structure reflecting and scattering at least partial light of the light source to enter the light guide panel for lateral transmission.

7. The backlight module of claim 6, wherein the backlight module further comprises a first reflective layer formed on the lighting board, and the first reflective layer is at least partially overlapped with the protrusion structure in a vertical direction.

8. The backlight module of claim 7, wherein the light guide panel has a light guide hole for accommodating the light source, and the first reflective layer is at least partially overlapped with the light guide hole in the vertical direction.

9. The backlight module of claim 6, wherein the backlight module further comprises an inner reflective area formed on the shielding sheet, and the inner reflective area is at least partially overlapped with the protrusion structure in a vertical direction.

10. The backlight module of claim 9, wherein the light guide panel has a light guide hole for accommodating the light source, and the inner reflective area is at least partially overlapped with the light guide hole in the vertical direction.

11. The backlight module of claim 9, wherein the backlight module further comprises an inner mask area formed above the inner reflective area, and the inner mask area is overlapped with the protrusion structure in the vertical direction.

12. The backlight module of claim 6, wherein the light guide panel has a light guide hole corresponding to the protrusion structure, and the light source is disposed in the light guide hole.

13. The backlight module of claim 6, wherein the backlight module further comprises at least one adhesive layer at least partially surrounding the protrusion structure in a vertical direction.

14. The backlight module of claim 13, wherein the light guide panel has a light guide hole, and a non-adhesive area is disposed between the at least one adhesive layer and the light guide hole of the light guide panel.

15. The backlight module of claim 6, wherein the backlight module further comprises a support frame disposed between the lighting board and the light guide panel, a bottom hole is formed on the support frame for accommodating the light source, and a limiting space is formed above the bottom hole for accommodating the light guide panel.

16. The backlight module of claim 6, wherein the backlight module further comprises a micro-structure layer formed on the light guide panel or the lighting board.

17. The backlight module of claim 6, wherein the protrusion structure comprises an upward-convex portion and a downward-convex portion, the downward-convex portion protrudes toward the light source, and the upward-convex portion protrudes away from the light source.

18. The backlight module of claim 17, wherein the upward-convex portion surrounds the downward-convex portion.

19. The backlight module of claim 17, wherein the protrusion structure further comprises a side arc portion surrounding the upper protrusion portion.

20. A backlight keyswitch comprising:
  a keycap;
  a support plate located under the keycap; and
  a backlight module disposed under the support plate, the backlight module comprising:
    a shielding sheet having a light permeable area;
    a light guide panel disposed under the shielding sheet;
    a lighting board disposed under the light guide panel and having a light source;
    a micro-structure layer comprising a plurality of micro-structures corresponding to the light permeable area of the shielding sheet, the micro-structure layer further defining a micro-structure clearance area surrounding the light source, and the plurality of micro-structures surrounding the micro-structure clearance area; and
    a protrusion structure formed on the shielding sheet and protruding toward the light source, the protrusion structure being overlapped with the micro-structure clearance area, and the protrusion structure reflecting and scattering at least partial light of the light source to enter the light guide panel for lateral transmission.

21. The backlight keyswitch of claim 20, wherein the support plate has a plurality of through holes, and the plurality of through holes is light-permeable and corresponds to the light permeable area of the shielding sheet.

22. The backlight keyswitch of claim 21, wherein the plurality of through holes has an inner portion respectively, and the inner portions of the plurality of through holes are at least partially overlapped with the micro-structure clearance area.

23. The backlight keyswitch of claim 22, wherein the backlight module further comprises an adhesive layer located between the protrusion structure and the inner portions of the support plate.

24. The backlight keyswitch of claim 20, wherein the backlight module further comprises an adhesive layer, and the micro-structure clearance area is at least partially located between the adhesive layer and the plurality of micro-structures.

25. The backlight keyswitch of claim 24, wherein the backlight module further comprises an inner reflective area, the inner reflective area is formed on the shielding sheet and corresponds to the light source, and the micro-structure clearance area is at least partially located between the inner reflective area and the plurality of micro-structures.

* * * * *